Figure 1:
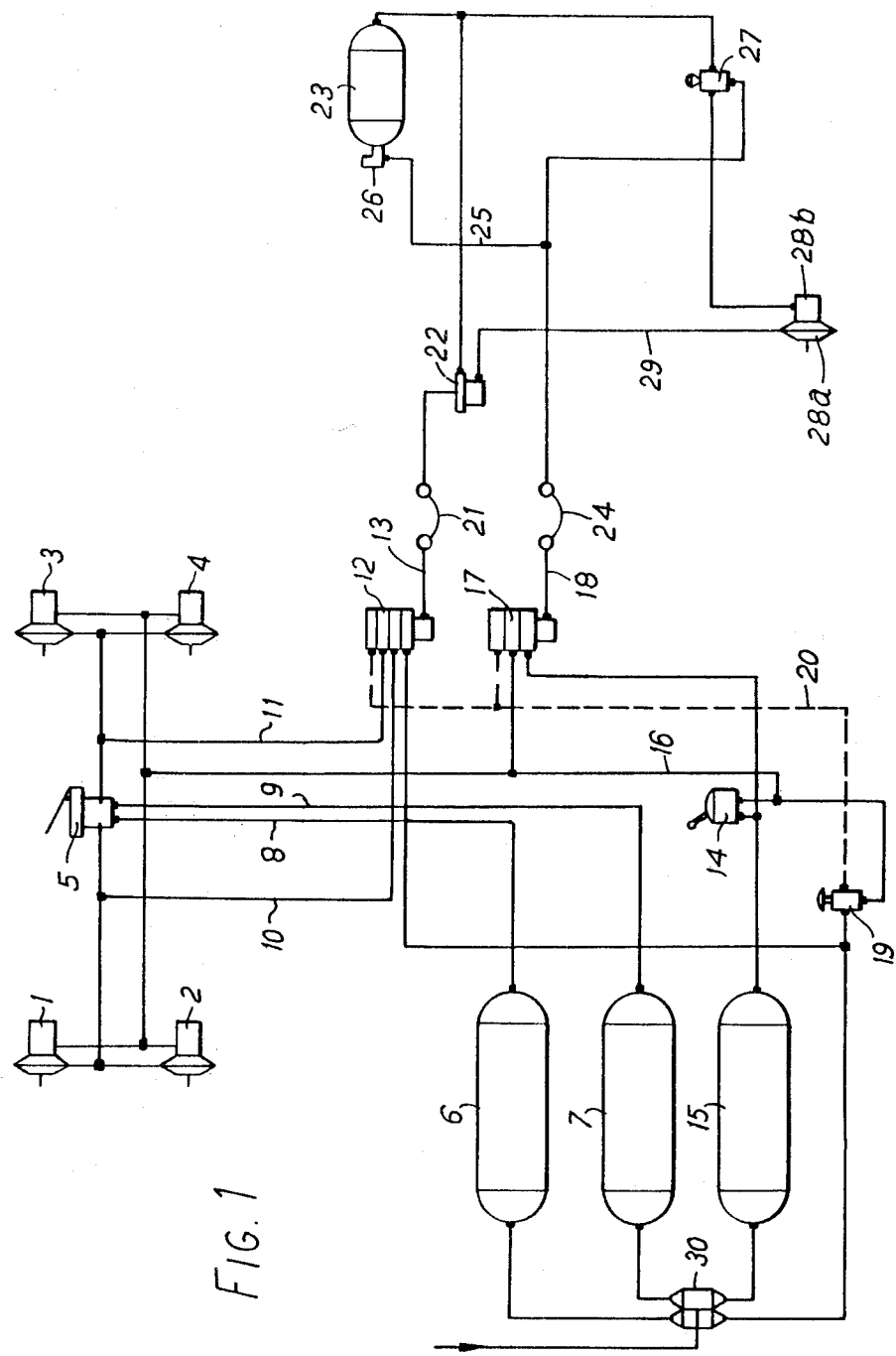

United States Patent [19]

Knight et al.

[11] 4,258,959
[45] Mar. 31, 1981

[54] FLUID PRESSURE OPERABLE TRACTOR AND TRAILER VEHICLE BRAKING SYSTEMS

[75] Inventors: David J. Knight; Sidney A. Lippiatt, both of Bath, England

[73] Assignee: Bendix Westinghouse Limited, Bristol, England

[21] Appl. No.: 927,264

[22] Filed: Jul. 21, 1978

[30] Foreign Application Priority Data

Jun. 25, 1977 [GB] United Kingdom ............... 26706/77

[51] Int. Cl.³ ............................................. B60T 13/00
[52] U.S. Cl. ............................................. 303/7; 303/9
[58] Field of Search ...................... 303/7, 9, 13, 71, 40

[56] References Cited

U.S. PATENT DOCUMENTS

| | | | |
|---|---|---|---|
| 3,228,730 | 1/1966 | Schubert | 303/7 |
| 3,666,324 | 5/1972 | Page | 303/9 |
| 3,718,372 | 2/1973 | Gruner | 303/40 |
| 3,820,854 | 6/1974 | Stearns | 303/9 |
| 3,929,381 | 12/1975 | Durling | 303/9 X |

Primary Examiner—Charles E. Frankfort
Assistant Examiner—Reinhard J. Eisenzopf
Attorney, Agent, or Firm—Ken C. Decker; William N. Antonis

[57] ABSTRACT

A tractor/trailer vehicle fluid pressure braking control system enabling two line control of trailer service and secondary braking includes for tractor braking a service brake control valve for controlling the fluid pressure applied both to service brake actuators and to a trailer service brake control line, a secondary control valve which controls the magnitude of a counteracting pressure applied to tractor spring brakes and also to a relay valve which controls a pressure in a trailer secondary spring brake control line.

9 Claims, 6 Drawing Figures

FLUID PRESSURE OPERABLE TRACTOR AND TRAILER VEHICLE BRAKING SYSTEMS

This invention relates to fluid pressure operable tractor and trailer vehicle braking systems and relates more especially to such systems wherein provision is made for secondary braking by spring brakes on the trailer.

It has hitherto been proposed to control trailer brakes in response to fluid pressures derived from control lines between tractor and trailer of a tractor/trailer combination wherein trailer service braking is controlled in sympathy with tractor brakes and trailer secondary braking in sympathy with operation of a secondary brake valve on the tractor being effected by a relay valve which controls the same actuators on the trailer for providing both secondary and service braking operation on the trailer. Additionally, it has been the practice to provide an emergency line between the tractor and trailer, the loss of pressure in which initiates the application of emergency braking pressure to the trailer brake actuators from a charged reservoir on the trailer.

Various other systems have already been proposed including the provision of spring brakes for parking and secondary braking on the trailer.

One object of the present invention is to provide improved tractor and trailer braking, the tractor system becoming compatible with the employment of spring brakes on the trailer and yet necessitating only two pipe connections between the tractor and trailer.

According to the present invention there is provided a tractor/trailer fluid pressure braking control system including for tractor braking a service brake control valve connected to control the magnitude of fluid pressure applied from a pressure reservoir to service brake actuators and to a trailer service brake control pressure line, a secondary brake pressure control valve connected to control the magnitude of a secondary brake control pressure applied to tractor spring brakes and characterized by the secondary brake control pressure being connected also to a relay valve for controlling the fluid pressure in a trailer secondary spring brake control line the whole being arranged to enable two-line control of trailer service brakes and secondary spring brakes.

Figure 2:
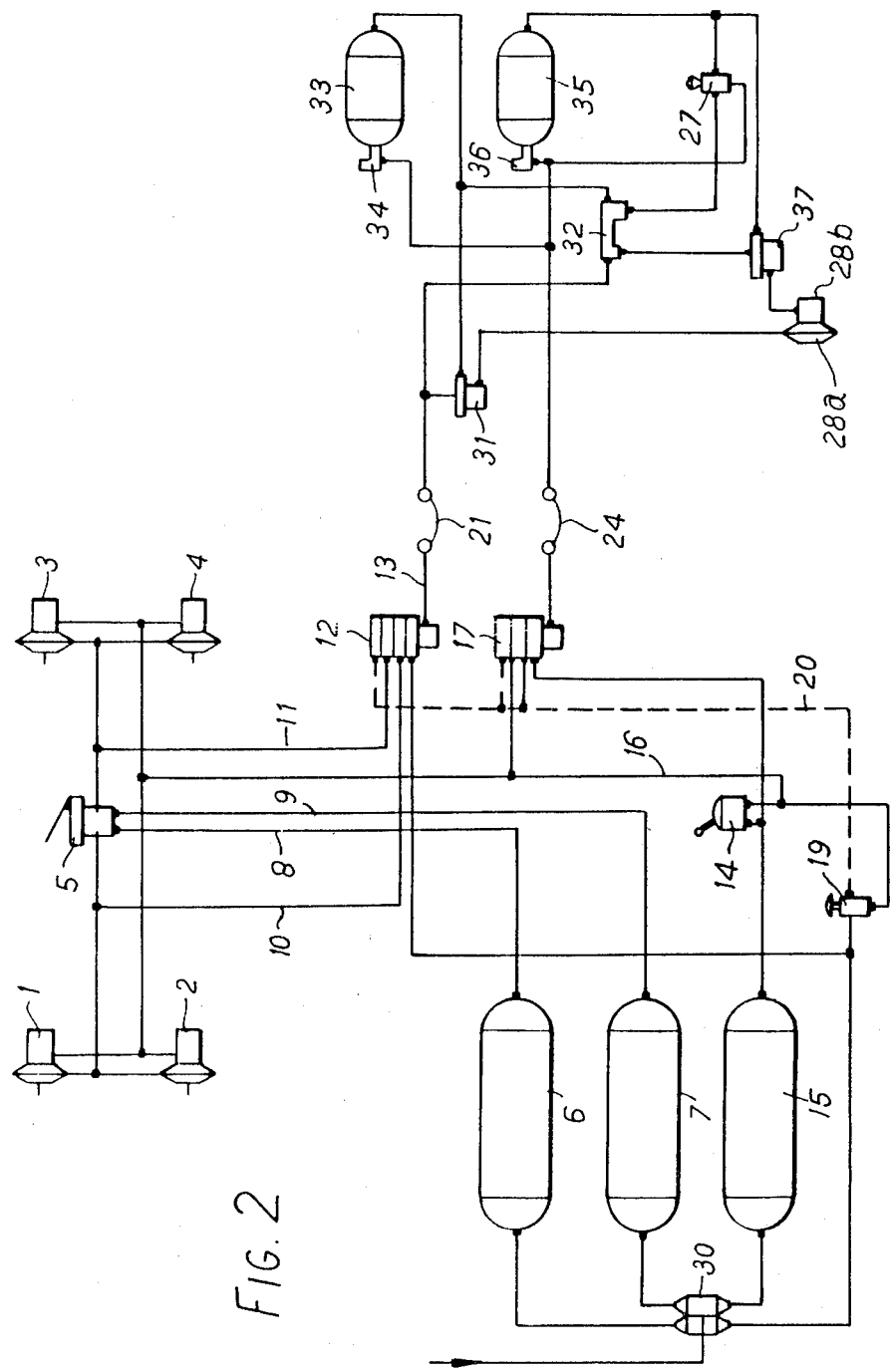
Figure 3:
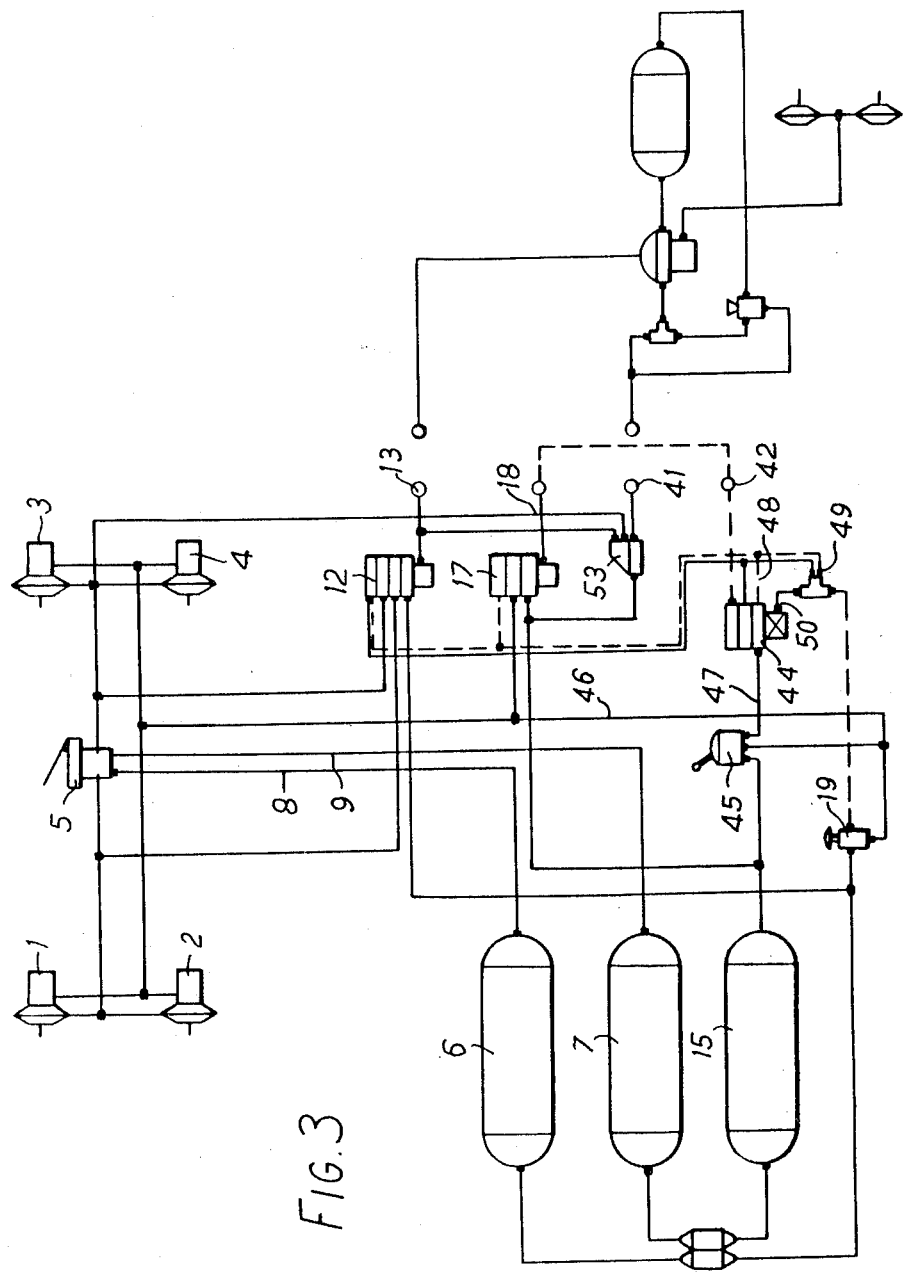
Figure 4A:
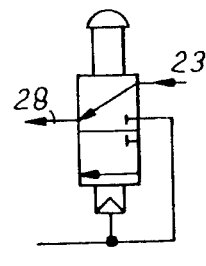
Figure 4B:
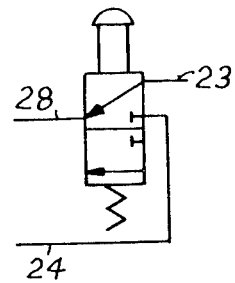
Figure 5:
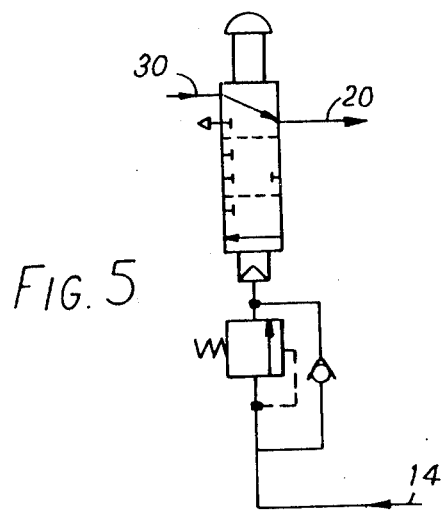

In order that the invention may be more clearly understood and readily carried into effect, the same will be further described by way of example with reference to the accompanying drawings of which FIGS. 1, 2 and 3 illustrate alternative braking systems making use of the present invention, FIGS. 4a and 4b illustrates in diagrammatical form a maneuvering valve suitable for use on a trailer and FIG. 5 illustrates a pressure responsive valve for use in the tractor system for preventing undesired spring brake release under certain conditions.

Referring to FIG. 1, the brake actuators on the tractor vehicle of a tractor/trailer combination are combined service and spring brake actuators on both front and rear wheels of the vehicle and these are denoted by references 1 to 4. The service portions of these actuators are operated by a dual foot valve denoted by reference 5 and by means of which the supplies to the front and rear brake actuator circuits are separately derived from service reservoirs 6 and 7 charged via a multi-circuit protection valve arrangement 30 from a conventional compressor arrangement driven by the engine of the tractor vehicle. Thus it will be observed that the front brake actuators 1 and 2 are supplied with fluid pressure from the reservoir 6 via supply line 8 in accordance with the foot pressure applied to the dual foot valve 5 and the rear brake actuators 3 and 4 are supplied with fluid pressure from the reservoir 7 via the supply line 9 and the foot valve 5. In addition to supplying the front and rear actuators, the outputs of the foot valve 5 are supplied via respective connections 10 and 11 to separate input chambers of a multi-relay valve 12. Valve 12 is supplied with fluid pressure via the multi-circuit protection valve 30 to provide on the trailer service line output coupling 13 a pressure which corresponds to the tractor service braking pressure. The multi-circuit relay valve is such that the largest of the normally equal pressures on lines 10 and 11 is effective to control the pressure at 13, thereby ensuring that trailer service braking is provided for even in the event of failure of one or other of the service circuits on the tractor.

For the purposes of secondary braking, a spring brake control valve denoted by reference 14 is provided on the tractor for manual operation by the driver in the event of failure of or inadequate response of the service braking system. This secondary spring brake control valve 14 is supplied by a further reservoir 15 charged from the multi-circuit protection valve 30 and provides on an output line 16 an inverse pressure to the spring brake portions of the actuators 1, 2, 3 and 4 of the tractor such that full pressure appears on the line 16 when the valve 14 is in the brakes-off position. Gradual movement of the handle of the valve 14 towards the brakes fully applied position, graduates the pressure reduction in the line 16 to provide graduable operation of the spring brakes. In addition, the output pressure on the line 16 appears as an input to a further relay valve 17 which derives its supply pressure from the reservoir 15 and thereby provides a corresponding inverse pressure on the trailer secondary line coupling 18.

The tractor braking circuit is additionally provided with a further pressure responsive valve denoted by reference 19 and which will be discussed in greater detail with reference to FIG. 4, this valve 19 provides, when required, a feed via the dotted connection 20 to a further input chamber of the multi-relay valve 12, such as to simulate the effect of a service brake pressure input to the relay valve 12 and produce an output pressure at the line 13 and to a further input chamber of the multi-relay valve 17 so as to simulate a brake release input to valve 17 and produce an output at line 18 enabling trailer recharge.

The trailer braking circuit comprises suitable couplers for connection to the service and secondary lines 13 and 18, the connection from the line 13 via coupler 21 comprises an input to a relay valve 22 supplied from a trailer reservoir 23. The output derived via the coupler 24 from the line 18 is supplied on the one hand via a connection 25 and a protection valve 26 to the reservoir 23 for charging that reservoir and on the other hand is supplied via a normally open passage through a maneuvering valve 27 to the spring brake portion 28b of combined spring and service brake actuators such as actuator 28, 28a, 28b on the trailer. The output of the relay valve 22 is supplied via connection 29 to the service portion of the combined spring and service brake actuators such as 28a.

In operation, assuming that the reservoirs 6, 7, 15 and 23 are charged to the fully charged system pressure, operation of the foot valve 5 applies service braking pressure to actuators 1, 2, 3 and 4 on the tractor and gives rise to a corresponding pressure at the coupler 21 to the relay valve 22 on the trailer. Thus, a corresponding pressure is relayed from the reservoir 23 to the service portions 28a of the actuators on the trailer.

In the foregoing, since the system is assumed to be fully charged, with the secondary brake handle of valve 14 in the brakes release position, full pressure is applied via the line 16 to the relay valve 17 and this provides full pressure via the coupler 24 and the valve 27 to the spring brake portions of the trailer brake actuators such as 28b. The spring brakes are thus maintained in the fully released position not only on the tractor but also on the trailer for normal operation.

In the event of the driver moving the handle of the spring brake control valve 14 to a position corresponding to a degree of application of the secondary brakes, a graduated reduction of pressure in the line 16 causes application of the spring brakes of the tractor and also causes a corresponding reduction of pressure at the coupler 24 which is thereby communicated via the valve 27 to the spring brakes of the trailer. The protection valve 26 prevents discharge of the reservoir 23 via the coupler 24 and relay valve 17.

Referring now to the maneuvering valve 27, this is provided to enable the trailer to be moved after having been uncoupled from the tractor and is shown in diagrammatical form in FIGS. 4a and 4b. Normally there is a way through the valve only from the coupler 24 to the spring brake portion of the actuators such as 28b, but when it is required to move the trailer other than by connection to the tractor, the valve 27 is manually operated to close off the connection to the coupler 24 and to connect the reservoir 23 to the trailer spring brakes. There is an additional safety feature built into the valve 27 to the extent that the valve reverts automatically to the normal operating condition when pressure is reapplied via the coupler 24 from a re-connected trailer system.

As in other fluid pressure operable braking systems using spring brakes, there is a possible shortcoming that in the absence of suitable precautions, spring brake circuits fed from a hand valve are liable (if the hand valve is moved to the release position whilst the system is unpressurised) to cause spring brake release and vehicle runaway when the engines are re-started. The valve represented by reference 19 is included to reduce this shortcoming and provides for the application to the line 20 of a quickly rising pressure when the system commences to recharge via the multiprotection valve 30 and this provides for a pressure at the couplers 21 and 24 so that the reservoir 23 is charged and the available pressure in the reservoir 23 to be applied via the relay valve 22 to the service brake actuators of the trailer. The valve 19 only reverts to its normal condition when a prescribed charged pressure is attained. The valve 19 will be described in greater detail with reference to FIG. 5.

Referring to FIG. 2, whilst the tractor braking circuit is substantially the same as that of FIG. 1, the trailer braking circuit now incorporates an additional spring brake relay valve denoted by reference 32 and additional reservoir.

For the sake of convenience, the components of the tractor braking system have been given the same reference numerals as those in FIG. 1, but the components in the trailer braking portion of the system, apart from the actuator 28a, 28b and the maneuvering valve 27, have been allocated a new series of references. The coupler 21 is connected to provide a controlling input to a relay valve 31 and also to one input of a spring brake relay valve denoted by reference 32. The supply to the relay valve 31 is derived as previously from a reservoir denoted by reference 33 which is charged as before via a protection valve 34 from the secondary line coupler 24. The line 24 also now provides a charging path for the second reservoir 35 via a protection valve 36 the output of 35 being connected on the one hand as a supply input to a further relay valve 37 and on the other hand as a supply input to the maneuvering valve 27. The coupler 24 additionally is connected via the normally operative path through the valve 27 to a second input to the spring brake relay valve 32. Supply pressures to the relay valve 32 are also derived from the reservoir 33 on the one hand and from the coupler 21 on the other hand.

The spring brake relay valve 32 is a valve of the type which is marketed as an SR-1 valve by the Heavy Vehicle System Group of the Bendix Corporation of the U.S.A. and described in U.S. Pat. No. 3,861,754. This is a valve which permits the spring brake circuit to be graduated in sympathy with a control pressure to a braking circuit on the trailer in the event of the latter braking circuit being defective.

In operation of the apparatus illustrated in FIG. 2, operation of the dual foot valve 5 by the driver causes service pressure to be derived from the reservoirs 6 and 7 for application to the service chambers of the brakes on the front and rear wheels of the tractor vehicle. The operation is substantially the same as for FIG. 1 and need not be discussed in greater detail but the effect of such service operation is to pressurize the line 13 correspondingly to the tractor service braking pressure and the corresponding input applied to the relay valve 31 relays pressure from the trailer service reservoir 33 to the service chambers of the trailer brake actuators such as 28a.

Under such conditions, the secondary spring brake valve is assumed to be in the fully released position and this means that a full pressure is applied via the coupler 24 to the reservoirs 33 and 35 via the respective protection valves thereof. The pressure at coupler 24 is also applied via the maneuvering valve 27 to the right hand input of the relay valve 32 to normally maintain the trailer spring brake portion of each trailer brake actuator such as 28b in the release condition via the relay valve 37.

In the event of the supply pressure derived from the reservoir 33 for the service braking circuit of the trailer system, falling below the pressure appearing at the input from the secondary coupler 24 via valve 27, the valve 32 operates during a service brake application to graduate a degree of spring brake pressure reduction via the valve 37 to supplement the service application to an extent which is necessary to compensate for the reduced supply pressure from 33.

For the purposes of secondary braking, the secondary spring brake valve 14 on the tractor is operated as before and the reduction of pressure which results via the relay valve 17 at the coupler 24 is transmitted via the way through the maneuvering valve 27 and the SR-1 relay valve 32 to produce a corresponding reduction of the output of relay valve 37 to apply the spring brakes on the trailer in sympathy with the tractor spring brakes.

For the same reasons as discussed above with reference to FIG. 1, the tractor braking circuit is provided with a further valve 19 which operates in identical manner.

Referring now to FIG. 3, this illustrates an elaboration of the tractor braking circuit described previously with reference to FIGS. 1 and 2 to adapt it for alternatively towing trailer vehicles with earlier types of braking circuit not having spring brakes.

The essential addition to FIG. 3 is that the secondary valve is a spring brake and secondary control valve which is capable of providing separate upright and inverse output pressures.

As previously, the tractor braking equipment consists of combined service and secondary spring brake actuators 1, 2, 3 and 4, the service chambers of which are supplied by a foot valve 5 which derives supply pressures via input lines 8 and 9 from respective front and rear supply reservoirs 6 and 7. Again, multi-circuit relay valves 12 and 17 are provided which feed outputs to couplers connected to lines 13 and 18 for supplying a two line trailer system with a spring brake, such as described with reference to FIG. 1 or FIG. 2. Additionally, two further output lines 41 and 42 are provided, the line 41 being equivalent to the emergency connection to a trailer with a normal two line system with a relay emergency valve as shown in FIG. 3, and the other line 42 being a connection for connecting a jumper lead from the line 18 to an on/off valve 44, the operation of which will become clear. The secondary spring brake control valve is now denoted by reference 45 and provides on the output line 46 an inverse pressure signal to operate the spring brakes of the tractor vehicle and also to provide an input to one chamber of the multi-relay valve 17. The other output of the valve 45 is on the line 47 and this is an upright output applied to the main input port of the on/off relay valve 44 which is such that when a controlling input is applied to it either at the coupler 42 or on the line 48 from a double check valve 49, a connection is provided between the input line 47 and an output line 50 which itself comprises one input to the double check valve 49. The second input to the check valve 49 is derived from the valve 19. The valve 19 is the same as employed in FIGS. 1 and 2. The emergency line connection 41 of the tractor is derived via a so-called supply dump valve 53 from the secondary or emergency supply reservoir 15 on the tractor. The supply dump valve receives also controlling input signals on the one hand from the output of the relay valve 12 and on the other hand from the output side of the rear brake circuit of the dual foot valve 5. The supply dump valve operates to compare the two input signals and dump the emergency pressure in the event of these signals being unequal, in other words, inconsistent with the service braking circuit being intact.

In operation of the system shown in FIG. 3, and assuming that the tractor system is coupled to a trailer having a more-or-less conventional trailer braking circuit such as is shown in FIG. 3, this trailer is coupled to the lines 13 and 41 and the lines 18 and 42 are connected by a jumper connection. During a service brake operation, with the secondary brake valve 45 in the brakes off condition, air is applied to the tractor spring brakes of actuators 1, 2, 3 and 4 to hold these in the fully released condition via the inverse pressure line 46 and the same pressure signal is applied to one chamber of the multi-relay valve 17 so that the relay valve 17 produces an output on the coupler line 18 and via the jumper connection to the input 42, the signal at 42 thus maintains the on/off relay valve 44 in the open condition connecting the output line 47 of the hand valve 45 to the output 50 and in this particular instance, the output pressure at 50 is zero pressure and therefore no pressure signal is applied from the double check valve 49 to the multi-relay valve 12. Only the service pressure signals produced via the dual foot valve 5 are applied to their respective chambers of the multi-circuit relay valve 12 to produce a service pressure output on the line 13 to the trailer braking system and thereby relay pressure from the trailer reservoir to the trailer single diaphragm actuators.

In order to apply the secondary brake, the driver operates the brake valve 45 to reduce the pressure in the tractor spring brakes via the line 46 and at the same time produce an increasing pressure on the line 47 and therefore at the output 50 of the on/off valve 44 to provide an input via the double check valve 49 to the upper chamber of the multi-circuit relay valve 12. This pressure signal on the multi-relay valve 12 provides for operation of the trailer braking system in proportion to the tractor secondary braking and the single diaphragm actuators are again operated. It will also be noted that by virtue of the increasing pressure at the output of the double check valve 49, an input is applied via the line 48 to the further input for the on/off relay valve 44 and thereby, in spite of loss of pressure at line 42, the on/off valve 44 is maintained in the open condition even following reduction to zero of the pressure signal on the line 46 to the relay valve 17.

In parking conditions, the hand valve 45 completely exhausts both the upright and inverse outputs thereof and therefore the parking of the combination is effected by virtue of the spring brakes on the tractor only.

When the tractor as shown in FIG. 3, is coupled to the novel type of trailer arrangement as shown for example in FIG. 1, a different mode of operation becomes effective. In this case, the jumper lead between couplers 18 and 42 is dispensed with and the trailer emergency or secondary connection is made to the coupler 18, the service connection remaining to the line 13. In the absence of a pressure signal via the jumper connection, the on/off relay valve closes and therefore the double check valve 49 normally provides no output to the multi-circuit relay valve 12. With the secondary brake valve 45 in the off position, air is supplied from this valve to the spring brakes on the tractor and also to the relay valve 17 as previously. The connection at 18 therefore has the effect of providing a charging path for the trailer reservoir and the spring brakes on the trailer are released as described previously. The service braking on the trailer is also effected via the relay valve 12 as before.

When the secondary brake valve 45 is set to a position corresponding to a desired degree of secondary braking, the inverse signal from the valve 45 is again effective on the line 46 to allow the tractor spring brakes to apply to a requisite degree and at the same time effect a reduction in the output pressure at 18 to the trailer secondary line to cause a corresponding trailer spring brake operation.

When parking the combination, the air pressure in the tractor spring brakes is vented via the valve 45 and at the same time the line 18 is vented via relay valve 17 in order to, in its turn, vent the trailer spring brakes.

The circuit for the tractor vehicle as illustrated in FIG. 3, may equally be coupled to a trailer braking circuit such as described with reference to FIG. 2.

Referring now to the maneuvering valve 27, the function of which is referred to generally in the foregoing descriptions of FIGS. 1, 2 and 3, two possible forms of the valve are illustrated diagrammatically in diagrams (a) and (b) of FIG. 4. The form used in FGIS. 1, 2 and 3 is assumed to be that of diagram (a) and the connections from the trailer reservoir, the coupler 24 and the trailer actuators such as 28 are correspondingly labelled. The valve (a) is shown in the maneuvering position wherein the manual operating button is depressed to connect the reservoir to the spring brake actuators, the other connection from coupler 24 being isolated. The valve is so constructed that once depressed, the button remains depressed, but is returned by recovery of pressure from coupler 24 on reconnection and pressurisation of the tractor system.

In FIG. 4(b), the reset connection is omitted and a spring is substituted so that it is necessary to hold the button down during maneuvering and the valve then resetting on release of the button.

The valve 19 is illustrated in FIG. 5 and is similar in construction to the valve of FIG. 4. With the manually operable button released and no air pressure output from the spring brake valve 14, there is no connection between the supply from 30 to the multi-relay valve 12. With no air pressure output from 14, the supply pressure is applied to the relay valve 12 and when the supply pressure recovers to a level greater than the setting of the reservoir charging protection valve 26, say 100 p.s.i., the valve resets to remove the pressure from the line 20.

Whilst not described in detail in the foregoing, it will be appreciated that the tractor system described above with reference to FIG. 3 can be coupled to a conventional three line trailer arrangement. Again, the trailer secondary line will be connected to the coupler at line 18, the connection 42 will remain vented and the third line or emergency being connected to the coupler at 41.

Also, whilst in the trailer braking arrangements of FIGS. 1 and 2, the trailer brakes are represented by a combined service and spring brake actuator 28a, 28b, it will be appreciated that, if desired, where the trailer has more than one axle, the service and secondary spring brakes may be partially or wholly separated to act on different axles.

We claim:

1. A tractor trailer fluid pressure brake control circuit comprising:
    tractor service and spring brakes;
    trailer service and spring brakes;
    a fluid pressure reservoir;
    a trailer service line for communicating fluid pressure to the trailer service brakes;
    a service brake control valve for generating a primary fluid pressure signal communicated to the tractor service brakes and to the trailer service line to control the application of the tractor and trailer service brakes;
    a trailer supply line for communicating fluid pressure to the trailer spring brakes;
    a manually operable auxiliary control valve for generating an inverted graduable auxiliary fluid pressure signal variable between minmum and maximum levels for communication to the tractor spring brakes and to the trailer supply line to control the application of the tractor and trailer spring brakes; and
    a manually operable pressure control valve for generating a maximum pressure signal communicated to the trailer service brakes to effect an application thereof and communicated to the trailer spring brakes to effect a release thereof and to effect a repressurization of the trailer supply line in response to an operator parking release input signal applied during a period when the tractor and trailer spring brakes are applied and when the tractor and trailer service brakes are released, the pressure control valve further comprising means responsive to a predetermined pressure in the trailer supply line for termination of the pressure signal communicated to the trailer service brakes to effect release thereof upon repressurization of the trailer supply line to said predetermined pressure.

2. The brake control system of claim 1 wherein said pressure control valve includes:
    a housing having a first inlet connected to the reservoir, a second inlet connected to the auxiliary control valve for receiving the auxiliary fluid pressure signal and an outlet connected to an inlet of the first relay valve means and to an inlet of the second relay valve means.

3. The brake control system of claim 1, further comprising:
    first relay valve means for controlling fluid pressure communication between the reservoir and the trailer service line and between the reservoir and the tractor service brakes; and
    second relay valve means for controlling fluid pressure communication between the reservoir and the trailer supply line and between the reservoir and the tractor spring brakes.

4. The brake control system of claim 3, wherein:
    the service brake control valve comprises a dual circuit valve having separate outputs connected to respective inputs of the first relay valve means for controlling the fluid pressure communicated to the trailer service line.

5. The brake control system of claim 3, further comprising:
    a further fluid pressure reservoir, the auxiliary brake control valve controlling communication between the further reservoir and the second relay valve means.

6. The brake control system of claim 3, wherein:
    the auxiliary brake control valve generates an upright pressure signal and a reverse pressure signal complimentary to the upright signal, the upright signal being communicated as an input to the first relay valve means to control the fluid pressure in the trailer service line for operation when towing a trailer having no spring brakes.

7. The brake control system of claim 6, wherein:
    the upright pressure signal is communicated to the first relay valve means via an on/off valve means held open by a pressure signal derived from the trailer supply line.

8. The brake control system of claim 1, further comprising trailer braking means having a further pair of fluid pressure reservoirs chargeable from the trailer supply line, one of the pair of reservoirs supplying fluid pressure via a service relay valve to the trailer service brake and the other of the pair of reservoirs supplying fluid pressure via a secondary relay valve to the trailer spring brake.

9. The brake control system of claim 8, further comprising:
    valve means for actuating the trailer spring brake to provide a supplemental braking force in response to a reduced pressure in the other of the pair of reservoirs.

* * * * *